United States Patent [19]

Barbachano et al.

[11] Patent Number: 4,961,851
[45] Date of Patent: Oct. 9, 1990

[54] SELF-CLEANING REVERSE OSMOSIS LIQUID TREATMENT SYSTEM, METHOD AND DUAL CONFIGURATION CHECK VALVE THEREFOR

[76] Inventors: Fernando G. R. Barbachano, 495 Montejo Avenue, Meridan, Yucatan, Mexico; Walter A. Sudymont, 19945 SW. 264th St., Miami, Fla. 33031

[21] Appl. No.: 511,719
[22] Filed: Apr. 20, 1990
[51] Int. Cl.$^5$ ............................................. B01D 61/08
[52] U.S. Cl. ......................... 210/321.65; 210/321.72
[58] Field of Search ............ 210/637, 195.2, 117–119, 210/136, 257.2, 321.6, 321.65, 321.72

[56] References Cited

U.S. PATENT DOCUMENTS 4,176,063  11/1979  Beall et al. ..................... 210/321.65
4,885,085  12/1989  Beall ................................. 210/321.6

Primary Examiner—Frank Sever
Attorney, Agent, or Firm—Charles J. Prescott

[57] ABSTRACT

A self-cleaning reverse osmosis liquid treatment system, method of cleaning a reverse osmosis membrane, and a dual configuration flow check valve for inlet and outlet heads of such a system. The system includes at least two membrane vessels each having at least one reverse osmosis membrane contained therein. One vessel processes intake liquid such as sea water, ground water or other fluids or juices into product liquid in the normal way, having a waste liquid discharge, while the other vessel simultaneously undergoes cleansing. Product liquid discharging from the vessel processing the product liquid is redirected at lower pressure back through an additional inlet in the inlet head having one check valve in its normally closed configuration positioned in the inlet head of the vessel being cleansed. Another check valve in a normally opened configuration in the outlet head of the vessel being cleansed cooperatively acts with the normally closed check valve in the inlet head to allow all liquid as product liquid to exit the cleansing vessel to a storage tank for later use. The flow of product liquid through the membrane being cleaned is at low pressure so that very little further reverse osmosis activity occurs in the membrane being cleansed and descaled. The check valves act in unison to close upon the introduction of intake liquid into the vessel at higher pressure to activate the cleansed membrane then ready for reuse.

4 Claims, 2 Drawing Sheets

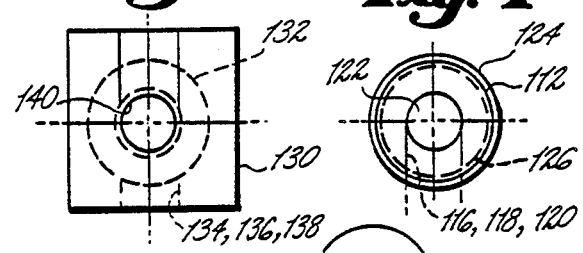
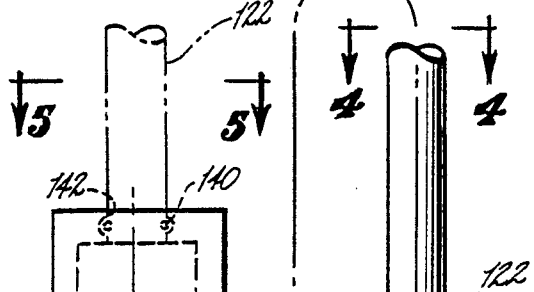
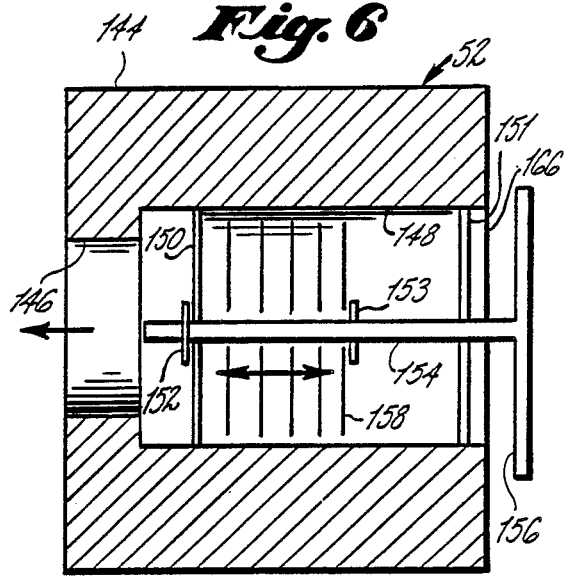
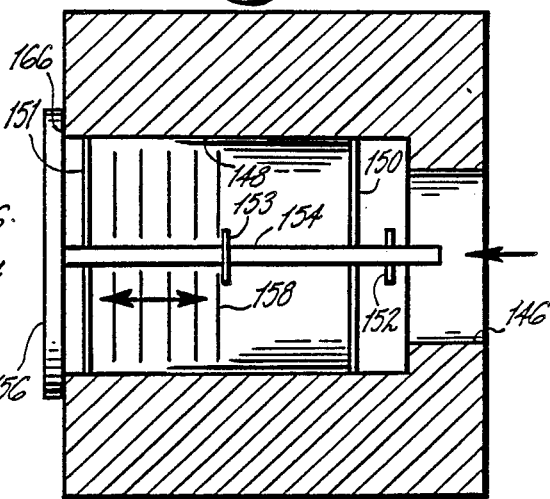
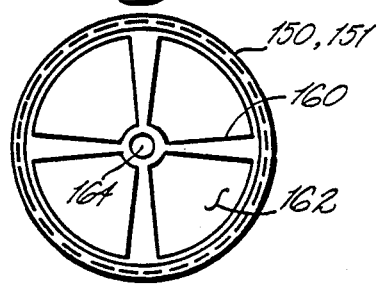

4,961,851

SELF-CLEANING REVERSE OSMOSIS LIQUID TREATMENT SYSTEM, METHOD AND DUAL CONFIGURATION CHECK VALVE THEREFOR

BACKGROUND OF THE INVENTION

This invention relates generally to fluid treatment systems, and more particularly to a system, method and dual configuration check valve for the continuous cleansing of reverse osmosis membranes contained within the system.

The reverse osmosis membrane is well suited to, and accepted for, purifying a variety of liquids, including sea water, ground water, and the like. However, the input surface of the membrane against which the pressurized input fluid to be purified is forced against and through becomes clogged of solid materials which have been filtered out to produce product liquid. As the deposit on the input surface of the membrane increase, efficiency of the membrane decreases rapidly.

A number of U.S. patents attempt to address the issue of cleansing of the filter or reverse osmosis membrane either during use or in conjunction with the interruption of the purifying process as follows:

U.S. Pat. Nos. 4,642,188 DeVisser, et al.
4,629,568 Ellis, III
4,632,754 Wood
4,705,625 Hart, Jr.
3,398,834 Nuttall, et al.
3,959,146 Bray
4,218,317 Kirschmann
3,922,301 Shippey, et al.
3,282,432 Greenleaf, Jr.
4,814,086 Bratt
4,744,895 Gales, et al.

However, none of these references disclose the present system or method, nor do these references approach the relatively high efficiency achieved with the present system, both in terms of being devoid of downtime, as well as the unique and highly efficient and conserving arrangement of utilizing product liquid to accomplish cleansing of the membrane.

BRIEF SUMMARY OF THE INVENTION

This invention is directed to a self-cleaning reverse osmosis liquid treatment system, method of cleaning a reverse osmosis membrane, and a dual configuration flow check valve for inlet and outlet heads of such a system. The system includes at least two membrane vessels each having at least one reverse osmosis membrane contained therein. One vessel processes intake liquid such as sea water, ground water or other fluids or juices into product liquid in the normal way, having a waste liquid discharge, while the other vessel simultaneously undergoes cleansing. Product liquid discharging from the vessel processing the product liquid is redirected at lower pressure back through an additional inlet in the inlet head having one check valve in its normally closed configuration positioned in the inlet head of the vessel being cleansed. Another check valve in a normally opened configuration in the outlet head of the vessel being cleansed cooperatively acts with the normally closed check valve in the inlet head to allow all liquid as product liquid to exit the cleansing vessel to a storage tank for later use. The flow of product liquid through the membrane being cleaned is at low pressure so that very little further reverse osmosis activity occurs in the membrane being cleansed and descaled. The check valves act in unison to close upon the introduction of intake liquid into the vessel at higher pressure to activate the cleansed membrane then ready for reuse.

It is therefore an object of this invention to provide a fully automatic self-cleaning reverse osmosis liquid purification system which continually functions to both produce product liquid and to cleanse one of the membranes simultaneously.

It is another object of this invention to provide a method of cleansing clogged reverse osmosis membranes utilizing product liquid from other active reverse osmosis membranes without the loss of product liquid to drainage.

It is yet another object of this invention to provide a dual configuration check valve for use in conjunction with the above system, one check valve in its normally opened configuration and another in its normally closed position acting in unison at opposite ends of each membrane-containing vessel to automatically activate the membrane cleansing process in that vessel.

In accordance with these and other objects which will become apparent hereinafter, the instant invention will now be described with reference to the accompanying drawings.

BRIEF DESCRIPTION OF THE DRAWINGS

FIG. 3 is an exploded partially broken side elevation view of the liquid inlet valve of the system shown in FIG. 1.

FIG. 4 is a view in the direction of arrows 4—4 in FIG. 3.

FIG. 5 is a view in the direction of arrows 5—5 in FIG. 3.

FIG. 6 is a side elevation section view of the dual configuration valve in its normally opened configuration.

FIG. 7 is a side elevation section view of the dual configuration valve in its normally closed configuration.

FIG. 8 is a side elevation view of the valve guide disc of the dual configuration check valve shown in FIGS. 6 and 7.

DETAILED DESCRIPTION OF THE INVENTION

Figure 1:
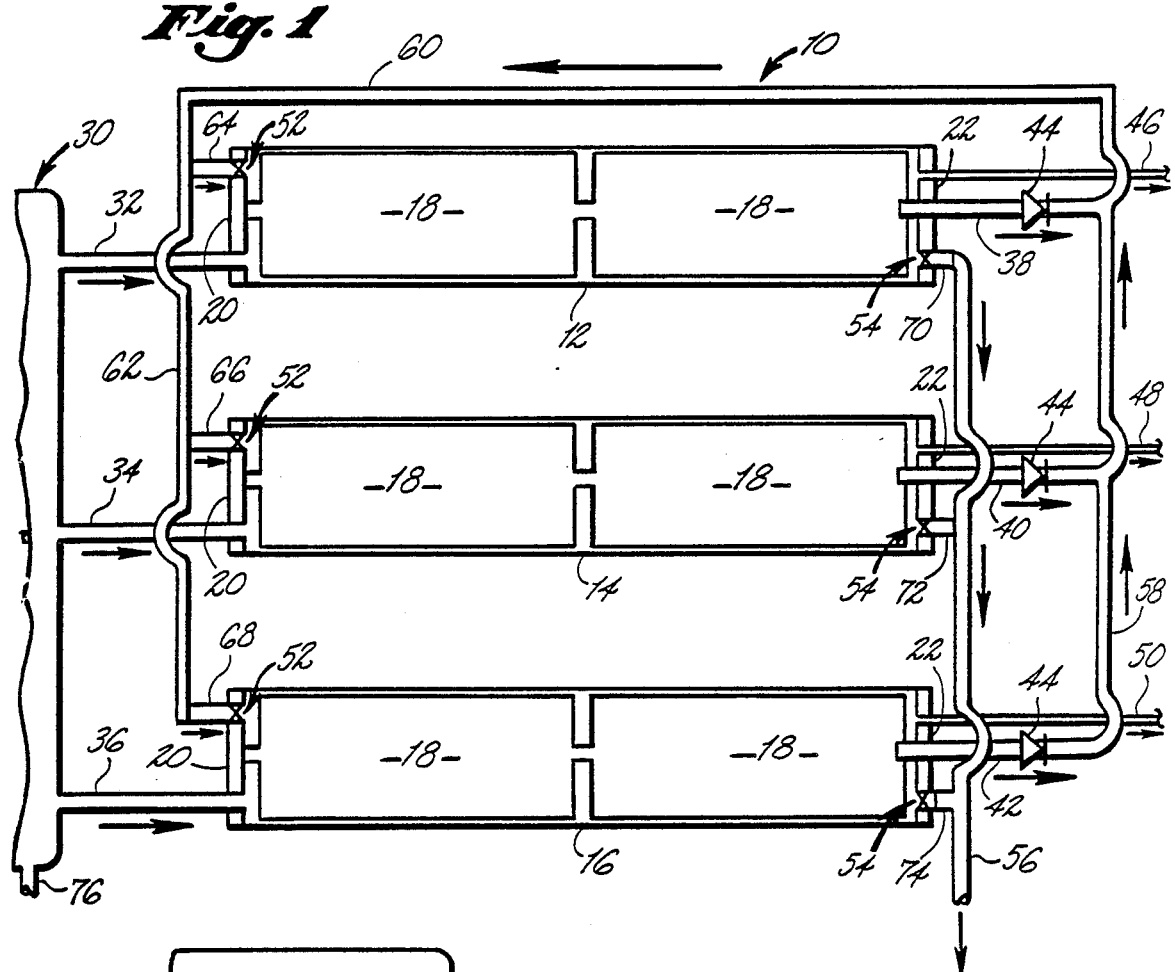
FIG. 1 is a schematic view of the invention including the dual configuration check valves.

Referring now to the drawings, and particularly to FIG. 1, the invention is shown generally at numeral 10 and includes a plurality of membrane vessels 12, 14, and 16. Each vessel 12, 14 and 16 includes series-acting reverse osmosis membranes 18 for increased efficiency. However, vessels 12, 14, and 16 containing these reverse osmosis membranes 18 otherwise act and function in the normal fashion receiving pressurized feed liquid against the membrane input surfaces to produce product liquid or permeate.

Throughout, the vessel which is producing product liquid will be referred to as the active or processing vessel while the vessel which is being cleansed will be referred to as the inactive or cleansing vessel.

Each vessel 12, 14, and 16 includes an inlet head 20 and an outlet head 22. Feed liquid inlets 32, 34, and 36 interconnect a feed liquid inlet valve 30 to each of the inlet heads 16 as shown. Feed liquid is thus delivered through each feed liquid inlet 32, 34, and 36 into one or more vessel 12, 14 and/or 16 by feed liquid inlet valve 30 as will be herebelow described. However, in general terms, the invention 10 calls for the feed liquid inlet valve 30 to deliver feed liquid to all vessels 12, 14 and/or 16 except for the one containing membranes 18 which are to be cleansed. The other two vessels 12, 14 and/or 16 continue to be active and to produce product liquid.

Typically, feed liquid is delivered by feed liquid inlet valve 30 at an elevated pressure of, e.g. greater than 40 p.s.i. and as high as 1,000 p.s.i. Feed liquid entering each vessel 12, 14 and 16 thus is introduced against the inlet surface of each reverse osmosis membrane 14 and a portion of that feed liquid is purified and passes by osmotic action as permeate through the walls of each membrane 18 and exits the vessels 12, 14 and 16 via the product liquid outlets 38, 40 and 42 of the corresponding active vessel. However, the majority of the feed liquid passes out of each active vessel 12, 14 and/or 16 by feed liquid outlets 46, 48 and/or 50 for discharge in the direction of the arrows.

Each product liquid outlet 38, 40, and 42 delivers product liquid into a product liquid outlet manifold 58. Conventional one-way check valves 44 in each product liquid outlet 38, 40, and 42 insure that product liquid only flows out of each vessel 12, 14, and 16 in the direction of the arrow beneath the check valve 44. Product liquid is then conveyed through the product liquid outlet manifold 58 in the direction of the arrows and through conduit 60 and into a product liquid inlet manifold 62. Thus, product liquid is available under a reduced pressure, e.g. 5-40 p.s.i, within product liquid inlets 64, 66 and 68 ready for delivery into each vessel 12, 14 and 16.

In normal continuous operation, then, the feed liquid valve 30 delivers pressurized feed liquid into two of the three feed liquid inlets 32, 34 and/or 36. Feed liquid is therefore shut off from one of the feed liquid inlets 32, 34 or 36, at which point the pressure within the vessel 12, 14, or 16 not receiving pressurized feed liquid, experiences a substantial reduction in internal pressure, at which point the normally closed check valve 52 which will be more fully described hereinafter, opens against the lower pressurized product liquid in product liquid inlet 64, 66 or 68. Product liquid then flows into the nonpressurized, inactive or cleansing vessel 12, 14, or 16. Simultaneously a normally open check valve 54, which is closed due to the feed liquid pressure in an active vessel, opens because of the reduced pressure in one of the vessels 12, 14 or 16 allowing the product liquid to exit the inactive vessel 12, 14 or 16 via storage tank outlet 70, 72, or 74 and into storage tank outlet manifold 56.

It should be now understood that this above-described arrangement provides for the delivery of purified product liquid produced by the active reverse osmosis membranes 18 within two of the three vessels 12, 14, and/or 16 for delivery into the inlet side of the nonactive vessel 12, 14, or 16. Because the product liquid is being delivered at a lower pressure, very little if any reverse osmosis action occurs within the inactive vessel. The product liquid simply flows through the membranes 18 of the inactive vessel 12, 14 or 16 scouring the inlet surfaces of the membranes 18 while passing therethrough. Because there is very little filtered solids deposited on the inlet surface of each membrane 18, and because a very high volume of product liquid flows therethrough, all of the product liquid which cleanses the inactive membranes 18 of vessel 12, 14 or 16 is still ready for collection by product outlet manifold 56 into a storage tank for use. Very little, if any, product liquid escapes from the inactive membrane 12, 14 or 16 through the feed liquid outlet 46, 48, or 50.

METHOD OF CLEANING

Figure 2:
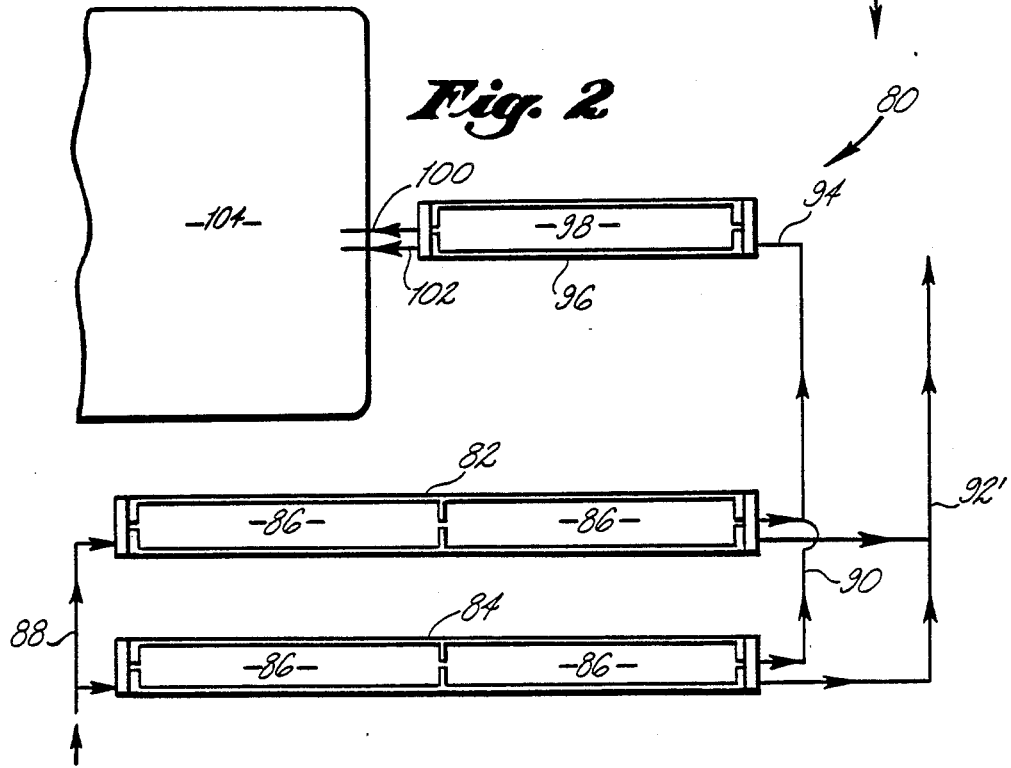
FIG. 2 is a schematic view depicting the method of the present invention.

Referring to FIG. 2, the method of cleaning is there more simply depicted. The membrane cleansing system shown generally at numeral 80 includes a pair of reverse osmosis vessels 82 and 84 each having two reverse osmosis membranes 86 acting in series for improved efficiency. Feed liquid is delivered in the direction of the arrow through inlet 88. Product liquid exits each vessel 82 and 84 into outlet manifold 90, while excess feed liquid is discharged into discharge manifold 92 for recycling or disposal in the normal fashion. Thus, all product liquid produced within vessels 82 and 84 is delivered by inlet tube 94 into vessel 96 which houses the reverse osmosis membrane 98 to be cleansed for later active use.

Again, the product liquid exiting vessels 82 and 84 into outlet manifold 90 is at a reduced pressure. Thus, all product liquid entering vessel 96 passes through membrane 98 scouring the inlet surface of the membrane 98. Because of the reduced pressure within vessel 96, virtually all of the product liquid exits through what would normally be considered the feed liquid discharge tube 102. Very little product liquid will exit the product liquid outlet tube 100; however, this product liquid exiting through the product liquid outlet tube 100, as well as the product liquid exiting the vessel 96 via the feed liquid outlet 102, are delivered into a storage tank 104 for use.

Thus, by the arrangement and method shown in FIG. 2, a clogged membrane 98 having been contaminated by use, may be quickly rejuvenated and cleansed by the very purifying arrangement within active vessels 82 and 84 from which it may have been temporarily removed. Further, this arrangement shows the unusual methodology of introducing product liquid into the vessel 96 at reduced pressure so that virtually all of the product liquid washes over the inlet surface of the membrane 98 to be cleansed and in the same direction of flow as when active. And product liquid, rather than feed liquid, exits the vessel 96 via the feed liquid outlet 102, rather than the product liquid outlet 100.

FEED LIQUID INLET VALVE

Referring now additionally to FIGS. 3, 4 and 5, the preferred embodiment of the feed liquid inlet valve 30 is there shown. Keep in mind that this invention's function is based upon the notion that at least one of a plurality of reverse osmosis vessels having membranes contained therein acting in parallel is to be cleansed and rejuvenated while the entire system is under full continuous operation. To that end, valve 30 is structured to deliver feed liquid into two of the three vessels 12, 14 and/or 16 while one of the vessels 12, 14, or 16 is disconnected from the source of pressurized feed liquid.

To accomplish this purpose, feed liquid inlet valve 30 includes an elongated housing 130 having a cylindrical inner surface 132 extending from one end toward, but not all the way to, the opposite end to form a reduced diameter hole 142. The housing 130 includes three apertures 134, 136 and 138 spaced longitudinally along housing 130 as shown.

A delivery spool 112 having an elongated hollow inner cavity 114 opened at its lower end as shown is also provided. Spool 112 includes three apertures 116, 118 and 120 which form discharge ports for feed liquid which enters into cavity 114 in the direction of the arrow and is also structured having a plurality of external O-rings 124 fitted within grooves 126 so that the spool 112 may slidably and sealably engage against surface 132 of housing 130 and wherein shaft 122 extends beyond the end of housing 130 as shown in phantom. O-ring 140 provides a seal against shaft 122.

Depending on the controlled positioning of spool 112 within surface 132 by longitudinal placement of shaft 122, two of the apertures 116, 118 and/or 120 are in alignment with two of the apertures 134, 136, and/or 138 in housing 130. Thus, feed liquid entering into cavity 114, although available to exit all three holes 116, 118 and 120 and spool 112, only exits from housing 130 through two of the three holes 134, 136 and 138 selected. These holes 134, 136 and 138 are connected and in fluid communication with the feed liquid inlets 32, 34, and 36 respectively, of FIG. 1 as previously described.

DUAL CONFIGURATION CHECK VALVE

Referring now to FIGS. 6, 7 and 8, the dual configuration check valve which is ideally suited for use as part of the present invention is there shown generally at numerals 52 and 54 and as referred to previously with respect to FIG. 1. The normally opened configuration is shown in FIG. 6, while the normally closed configuration is shown in FIG. 7.

Each check valve 52 and 54 includes a housing 144 which is connectable within inlet and outlet heads 22 and 20, respectively and has a cylindrical threaded bore 148 reduced in diameter at one end at 146 and one end sealing surface 166 at the other end of threaded bore 148. Valve guide discs 150 and 151, formed of relatively thin, flat rigid stock and having an externally threaded outer surface threadably engage within threaded bore 148 in spaced apart relationship therewithin as shown in FIGS. 6 and 7. Each valve guide disc 150 and 151 includes a central hole 164 and a plurality of liquid flow apertures 162 formed by spokes 160 radially from the central hole 164.

Slidably disposed within holes 164 of each valve guide disc 150 and 151 is an elongated shaft 154 having a closure plate 156 centrally positioned and orthogonally disposed at one end. This closure plate 156 sealably mates against sealing surface 166 of housing 144 so as to prevent liquid flow through housing 144. Fixedly disposed on each shaft 154 are retaining clips 152 and 153, one clip 152 positioned on shaft 154 near its distal end and the other clip 153 positioned at a mid point therealong. These retaining clips 152 and 153 are of a well-known type and snap within grooves formed in shaft 154 so as not to slide or otherwise be displaced with respect to shaft 154. Retaining clip 152 prevents shaft 154 from being removed from slidable engagement within hole 164 of valve guide disc 150.

A compression bias means such as a compression spring 158 is also provided which will slide within threaded bore 148 and around shaft 154. The positioning of this compression spring 158 will determine the normally opened or normally closed configuration of the check valve 52 or 54. When positioned as shown in FIG. 6 between valve guide disc 150 and retaining clip 153, compression spring 158 acts to exert force equally in the direction of the arrows. Compression spring 158 thus forces closure plate 156 away from sealing surface 166 until retaining clip 152 contacts valve guide disc 150.

The normally closed configuration of valve 54 is shown in FIG. 7. Closure plate 156 is forced against sealing surface 166 of housing 144 by positioning compression spring 158 as shown. The compression spring 158 thus acts between valve guide disc 151 and retaining clip 153 as shown by the arrows so as to urge the closure plate 156 against sealing surface 166. When opened by pressurized feed liquid in the direction of the arrow into bore 146, the pressure against the inner surface of closure plate 156 will drive it into an open configuration.

These check valves 52 and 54 are intended to move from their relaxed position to their active position under a very low differential pressure of e.g. 3-6 p.s.i. across the closure plate 156. Compression spring 158 may be substituted for more sophisticated magnetically activated devices which function in the same manner.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A self-cleaning reverse osmosis liquid treatment system comprising:
   at least two reverse osmosis membrane vessels each housing at least one reverse osmosis membrane therein, one of said vessels being a processing vessel and the other said vessel being a flushing or cleansing vessel;
   each said vessel including an inlet head having an intake liquid inlet and a product liquid inlet each in fluid communication with said membrane within the corresponding said vessel and an outlet head having a waste liquid outlet, a product liquid outlet, and a storage tank outlet;
   a intake liquid inlet valve which selectively delivers intake liquid under higher pressure to said intake liquid inlet of said processing vessel;
   a product liquid outlet manifold connected to each said product liquid outlet for collecting product liquid discharging from said processing vessel;
   a product liquid inlet manifold connected at one end to said product liquid outlet manifold and connected at the other end to each said product liquid inlet;
   a normally closed check valve positioned in each said product liquid inlet and a normally open check valve positioned in each said storage tank outlet;
   means for enabling each said normally closed and normally opened check valve in each said vessel cooperatively to act to allow product liquid to enter each said cleansing vessel to flush through each said membrane therein and to discharge through each said storage tank outlet into a storage tank manifold when higher pressure intake liquid flow into said intake liquid inlet is shut off by said intake liquid inlet valve.

2. A system as set forth in claim 1, wherein said normally open check valve and said normally closed check valve includes:

a housing having a cylindrical threaded bore therethrough, said threaded bore having an inlet end and an outlet end;

a first and second circular guide valve disc each having a central aperture and liquid flow apertures spaced radially between said central aperture and a threaded periphery of each said valve guide disc;

said first and second valve guide discs threadably engagable into said housing threaded bore in spaced apart relation;

a closure plate having an orthogonal, centrally disposed shaft extending from one side thereof, said closure plate sealably matable over one said end of said threaded bore, said shaft slidably supported within each said central aperture;

first and second retaining means fixedly positioned on said shaft near the end of said shaft and at a midpoint of said shaft, respectively, said first retaining means positioned adjacent the distal end of said shaft and in close proximity to said first valve guide disc for limiting axial movement of said shaft from said valve guide disc, said second retaining means positioned at a midpoint along said shaft for retaining one end of a tensioned bias device positioned within said threaded bore;

said check valve acting in its normally opened configuration with said closure plate positioned and sealably mating against said inlet end when said tensioned bias device is positioned and acting between said second retaining means and said first valve guide disc;

said check valve acting in its normally closed configuration with said closure plate positioned and sealably mating against said outlet end when said tensioned bias device is positioned and acting between said second retaining means and said second variable guide disc.

3. A system as set forth in claim 2, further comprising:

a check valve positioned between said product liquid outlet and said product liquid outlet manifold for preventing reverse flow of product liquid back into either said vessel through its product liquid outlet.

4. A self-cleaning reverse osmosis liquid treatment system comprising:

at least two reverse osmosis membrane vessels each housing at least one reverse osmosis membrane therein, one of said vessels being a processing vessel and the other said vessel being a flushing of cleansing vessel;

each said vessel including an inlet head having an intake liquid inlet and a product liquid inlet each in fluid communication with said membrane within the corresponding said vessel and an outlet head having a waste liquid outlet, a product liquid outlet, and a storage tank outlet;

an intake liquid inlet means for selectively delivering intake liquid under higher pressure to said intake liquid inlet of said processing vessel;

a product liquid outlet means connected to each said product liquid outlet for collecting product liquid discharging from said processing vessel;

a product liquid inlet means connected at one end to said product liquid outlet means and connected at the other end to each said product liquid inlet for delivering product liquid from said processing vessel to said product liquid inlet of said cleansing vessel;

a normally closed check valve positioned in each said product liquid inlet and a normally open check valve positioned in each said storage tank outlet;

means for enabling each said normally closed and normally opened check valve in each said vessel cooperatively to act to allow product liquid to enter each said cleansing vessel to flush through each said membrane therein and to discharge through each said storage tank outlet into a storage tank manifold when higher pressure intake liquid flow into said intake liquid inlet is shut off by said intake liquid inlet means.

* * * * *